United States Patent
Nishtala

(10) Patent No.: US 9,582,218 B2
(45) Date of Patent: Feb. 28, 2017

(54) SERIAL ATTACHED STORAGE DRIVE VIRTUALIZATION

(71) Applicant: Cisco Technology, Inc., San Jose, CA (US)

(72) Inventor: Satyanarayana Nishtala, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 207 days.

(21) Appl. No.: 13/737,479

(22) Filed: Jan. 9, 2013

(65) Prior Publication Data
US 2014/0195770 A1    Jul. 10, 2014

(51) Int. Cl.
*G06F 12/00* (2006.01)
*G06F 3/06* (2006.01)
*H04L 29/08* (2006.01)

(52) U.S. Cl.
CPC .......... *G06F 3/0644* (2013.01); *G06F 3/0604* (2013.01); *G06F 3/067* (2013.01); *G06F 3/0626* (2013.01); *G06F 3/0665* (2013.01); *H04L 67/1097* (2013.01)

(58) Field of Classification Search
CPC .... G06F 3/0644; G06F 9/5077; G06F 3/0665; G06F 3/0664; G06F 3/067; G06F 3/0689
See application file for complete search history.

(56) References Cited

U.S. PATENT DOCUMENTS

| | | | |
|---|---|---|---|
| 6,442,158 B1 * | 8/2002 | Beser | 370/352 |
| 6,976,134 B1 * | 12/2005 | Lolayekar | G06F 3/0613 709/214 |
| 7,363,404 B2 * | 4/2008 | Boyd et al. | 710/104 |
| 7,519,725 B2 * | 4/2009 | Alvarez | H04L 12/2602 370/229 |
| 8,160,072 B1 * | 4/2012 | Gnanasekaran et al. | 370/392 |
| 8,255,607 B2 | 8/2012 | Jones et al. | |
| 8,479,211 B1 * | 7/2013 | Marshall | G06F 11/14 707/770 |
| 8,539,197 B1 * | 9/2013 | Marshall | G06F 13/00 711/112 |

(Continued)

OTHER PUBLICATIONS

Ran, Shuping "A Model for Web Services Discovery with QoS", ACM SIGecom Exchanges 2003.*

*Primary Examiner* — David X Yi
*Assistant Examiner* — Francisco Grullon
(74) *Attorney, Agent, or Firm* — Edell, Shapiro & Finnan, LLC

(57) ABSTRACT

Techniques are provided for an access device, such as a Serial Attached Small Computer System Interface (SAS) expander, that is in communication with a storage device to subdivide the storage space of the storage device into a plurality of logical storage spaces, where the access device mediates storage and retrieval of data to and from the storage device. The access device maintains a unique identifier assigned to each of the logical storage spaces. Storage and retrieval of data to and from at least one of the logical storage spaces by way of the access device is based on the assigned unique identifier. The storage space may be subdivided using logical block addresses (LBAs) of the storage device without physically partitioning the available storage on the storage device.

20 Claims, 6 Drawing Sheets

(56) References Cited

U.S. PATENT DOCUMENTS

| | | | |
|---|---|---|---|
| 2003/0079019 A1* | 4/2003 | Lolayekar | H04L 67/1097 709/226 |
| 2004/0043755 A1* | 3/2004 | Shimooka et al. | 455/410 |
| 2006/0101171 A1* | 5/2006 | Grieff et al. | 710/36 |
| 2006/0215663 A1* | 9/2006 | Banerjee et al. | 370/395.21 |
| 2007/0061441 A1* | 3/2007 | Landis | G06F 9/5077 709/224 |
| 2007/0112723 A1* | 5/2007 | Alvarez | G06F 9/50 |
| 2007/0165660 A1* | 7/2007 | Fang et al. | 370/410 |
| 2009/0007155 A1* | 1/2009 | Jones et al. | 719/327 |
| 2009/0037565 A1* | 2/2009 | Andresen et al. | 709/222 |
| 2009/0089458 A1* | 4/2009 | Sugimoto | G06F 3/0613 710/6 |
| 2009/0252037 A1* | 10/2009 | Barzilai | H04L 29/06 370/235 |
| 2009/0303990 A1* | 12/2009 | Ambrose et al. | 370/389 |
| 2010/0100878 A1* | 4/2010 | Otani | 718/1 |
| 2010/0122124 A1* | 5/2010 | Chen et al. | 714/57 |
| 2010/0293349 A1* | 11/2010 | Lionetti et al. | 711/162 |
| 2011/0107002 A1* | 5/2011 | Jones et al. | 710/312 |
| 2011/0131375 A1* | 6/2011 | Noeldner et al. | 711/114 |
| 2012/0066413 A1* | 3/2012 | Tokoro | G06F 3/0605 710/6 |
| 2012/0137065 A1* | 5/2012 | Odenwald et al. | 711/114 |
| 2012/0203999 A1* | 8/2012 | Jess | G06F 3/0605 711/173 |
| 2013/0166727 A1* | 6/2013 | Wright | G06F 3/0613 709/224 |

* cited by examiner

600

SERIAL ATTACHED STORAGE DRIVE VIRTUALIZATION

BACKGROUND

Capacity of storage drives in computer systems, such as servers is often underutilized. Drive manufacturers tend to maintain the average selling price of a drive while increasing capacity through the use of technological advances. Therefore, it is often not practical to reduce the system cost, even if storage demands do not increase as offered capacity increases. In some applications, it is beneficial to share a drive across multiple hosts or servers. In conventional systems, a storage controller is used to implement volume management and carve out volumes from shared drives.

By way of example, the storage controller is positioned between the host servers and the storage drives, using a one of multiple storage networking standards such as Serial attached SCSI (SAS), Internet Small Computer System Interface (iSCSI) or fiber channel (FC). This storage controller is used to logically partition the drives and then to assign a logical unit number (LUN), e.g., LUN 0, LUN 1, and so on, to each partition. A host can then access a given volume for data storage and retrieval by addressing it using the LUN number in the storage network protocol, as defined by standards. In these storage environments the physical partitioning of drives by administrators, as well as LUN management, becomes expensive to scale as the number of hosts and LUNs increases.

DESCRIPTION OF EXAMPLE EMBODIMENTS

Overview

Techniques are provided herein for an access device that is in communication with a storage device to subdivide the storage space of the storage device into a plurality of logical storage spaces, where the access device mediates storage and retrieval of data to and from the storage device. The access device maintains a unique identifier assigned to each of the logical storage spaces. Storage and retrieval of data to and from at least one of the logical storage spaces by way of the access device is based on the assigned unique identifier. The storage space may be subdivided using logical block addresses (LBAs) of the storage device.

Example Embodiments

Figure 1:
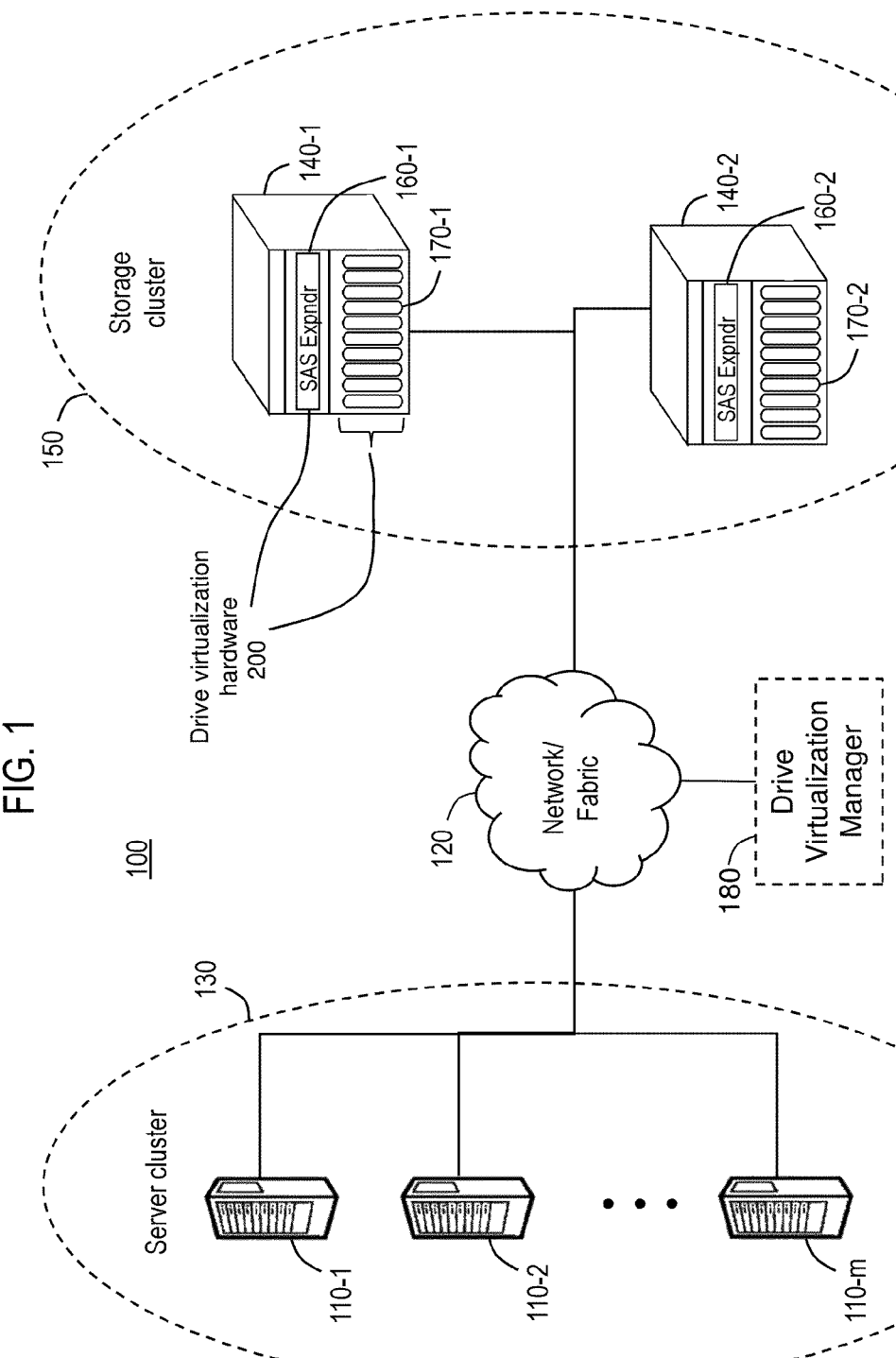
FIG. 1 is an example block diagram of a network with a storage virtualization device in communication with a storage drive that subdivides the storage drive into a plurality of virtual drives according to the techniques described herein.

Referring first to FIG. 1, an example system 100 is shown. System 100 comprises a server cluster 130 with a plurality of physical servers 110-1 through 110-m and a storage cluster 150 with plurality of storage arrays, examples of which are shown at 140-1 and 140-2, in a switched fabric or network 120. In this regard, network 120, server cluster 130, and storage cluster 150 may be part of a fiber channel (FC) system in a data center or shared storage system in a private network, e.g., a site based or isolated network. While initially described in plural form, e.g., the plurality of physical servers 110-1 through 110-m, plural items may be referred to in aggregate such as servers 110. Each storage array 140 has a Serial Attached SCSI (SAS) expander 160-1 or 160-2 and a plurality of drive carriers or drives 170-1 and 170-2 with supported storage drives, respectively. In a typical example, each SAS expander 160 may support 16 or 24 drives, although other support enumerations are available.

As used herein, the terms "drive," "hard drive," or "storage drive" refer to physical drives, while the terms "logical drive" or "virtual drive" refer to portions of a physical drive that has been virtually subdivided or virtually partitioned according to the techniques presented herein.

In a network environment such as in system 100, multiple servers 110 may access one or more drives or groups of drives 170. In many cases drives 170 are underutilized by a server, and it becomes desirable to share a drive across multiple servers in order to reduce overall system cost. Conventional systems use volume management implemented at a centralized controller located between the servers and drives to get higher capacity and/or larger number of logical drives out of the attached physical drives, e.g., LUNs, as mentioned above. In another example, drives may be attached to multiple servers through a zoned fabric that hard assigns a given drive to a given server blade. In this conventional architecture, the number of drives must equal or exceed the number of attached servers, even when more drive capacity is allocated to a server than is useful to the server.

The embodiments described herein virtualize a drive to logically partition it at the drive level. Virtualization of the drive capacity at the drive level allows each physical drive to appear as multiple drives so that the system can be configured with fewer drives than required in conventional systems. As described in detail below, a storage drive is virtualized so that it can be shared by multiple hosts or devices (e.g., servers). This technique enables a lower cost solution using stateless switching fabrics (e.g., SAS expanders, FC SAS bridges), Ethernet switches, etc., to create a group of drives that can support a large number of servers, thereby offering cost efficiencies. Significant cost savings are also obtained by eliminating the need for conventional centralized storage controllers. Partitioning storage at the physical drive level allows system configurations to decouple the number of drives from the number of servers and enables a given set of physical drives to be presented as a larger number of logical drives, both for redundancy and cost purposes.

Each of the drives 170 has an associated virtualization hardware device that resides external to the drives, but mediates communication between the drive and the initiator such as a server, e.g., for storage and retrieval of data. The virtualization hardware subdivides or partitions a drive into logical drives. Note that the SCSI standard allows multiple LUNs on a single interface, e.g., by way of storage controllers, as address by a World Wide Name (WWN) assigned to the drive at the time of manufacturer. However, all industry standard hard drives implement a single LUN.

In this regard, the drives 170 may be, e.g., SAS drives or FC drives comprising a hard disk drive (HDD), solid state drive (SSD), hybrid drive, RAM (Random Access Memory), or any other suitable storage medium. The drives 170 may be, for example, direct attached storage (DAS) for blade servers. In one embodiment, the servers 110 communicate with the drives 170 via a storage protocol that runs SCSI. The servers 110 and drives 170 may communicate, for example, using SAS, FC, Serial Advanced Technology Attachment (SATA), Ethernet, or other suitable protocol.

The network 120 may include any number of nodes including, for example, SAS expanders, SAS switches, FC-SAS bridges, or other network components. The SAS expanders facilitate data transfer between multiple initiator devices (e.g., servers 110) and multiple target devices (e.g., drives 170). The network 120 may include or be coupled to one or more networks (e.g., a local area network (LAN), public switched network, virtual local area network (VLAN), virtual private network (VPN), metropolitan area network (MAN), wide area network (WAN), storage area network (SAN), enterprise network, Internet, intranet, or any other network).

As described in detail below, the drives 170 are logically partitioned into a plurality of virtual drives at a SAS (or other interface/protocol) level so that each physical drive can be shared by multiple servers 110. This allows the system 100 to decouple the number of drives 170 from the number of servers 110, and enables a given set of physical drives to be presented as a larger number of logical drives. The drives 170 may each have the same number of virtual drives or one or more drives may have a different number of virtual drives. Any number of the logical partitions may be used for redundant storage of data. For example, the logical partitions in one or more storage devices may be configured as a Redundant Array of Independent Disks (RAID) group with the RAID functionality located in the servers 110 rather than by way of conventional volume management.

A SAS system, such as that shown in FIG. 1, comprises basic components such as an initiator, a target, an expander, and possibly a service delivery subsystem, as termed in SAS parlance. An initiator is a device that originates device service and task management requests to be processed by a target device, and receives responses for the same requests from one or more target devices. Initiators may be provided as an on-board component on the server's motherboard (as is the case with many server-oriented motherboards) or as an add-on host bus adapter. A target is a device containing logical units and target ports that receives device service and task management requests for processing and sends responses for the same requests to initiator devices. A target device could be, e.g., a hard disk or a disk array system. A service delivery subsystem is a part of an I/O system that transmits information between an initiator and a target. Cables connecting an initiator and target with or without expanders and backplanes constitute a service delivery subsystem. Expanders are devices that are part of a service delivery subsystem that facilitates communication between SAS devices, and facilitates connection of multiple SAS end devices to a single initiator port.

As viewed in FIG. 1, virtualization hardware options 200 are shown that may reside in a SAS expander, e.g., in SAS expanders 160, or as part of drive carrier for drives 170. These example virtualization hardware options are described as examples in connection with FIGS. 3 and 4, respectively. The virtualization hardware function determines virtual drive partition sizes, assigns a unique identifier to each partition, and may also regulate access privileges to the various partitions. The partition size, unique identifier, and access privileges may be referred to as virtualization parameters. As such, system 100 may employ an optional drive virtualization manager 180 that determines the way the attached drives are to be virtualized, and sends virtualization information or map to the various distributed virtual drive managers, e.g., SAS expanders 160. In general, management system 180 discovers and maintains an inventory of attached drives, and determines the number of virtual drives to be assigned to servers based on requirements, and virtualizes the drives as needed.

Each of the virtualized drives has a unique assigned WWN, and will appear in the storage network as a SCSI device. The management system 180 can determine which of the drives need to be visible to which servers, and masks out the rest of the drives, e.g., using mechanisms that are based on the type of the storage network. Once a set of drives, physical or virtual, are made visible to a given server, it will discover them as the server boots.

It should be noted that a limited number of devices are shown in the various figures in order to simplify description of the techniques presented herein. For example, in a data center or other networking environments any number of routers, switches (core, access, aggregation, etc.), edge devices, hypervisors, or management devices may exist that may not be germane to the description provide herein.

Further, there is no need for a one-to-one correspondence between servers 110 and drives 170 or for the number of drives to exceed the number of servers. There may be, for example, more servers 110 than drives 170, more drives than servers, or the same number of servers and drives. As described below, write operations are performed directly to the drives 170 without a conventional centralized controller and the associated cache and volume management. By virtue of the techniques described herein, drive virtual partitioning and management becomes distributed across SAS expanders and managed by a management system.

A server 110 may be a blade server, rack server, virtual server, or any other type of network device or physical or logical component (e.g., virtual machine, virtual desktop) configured to perform server or service operations. In one example, multiple server blades 110 are housed together in a chassis. The servers 110 may operate, for example, in a data center network, and may be configured to host any number of virtual machines.

Figure 2:
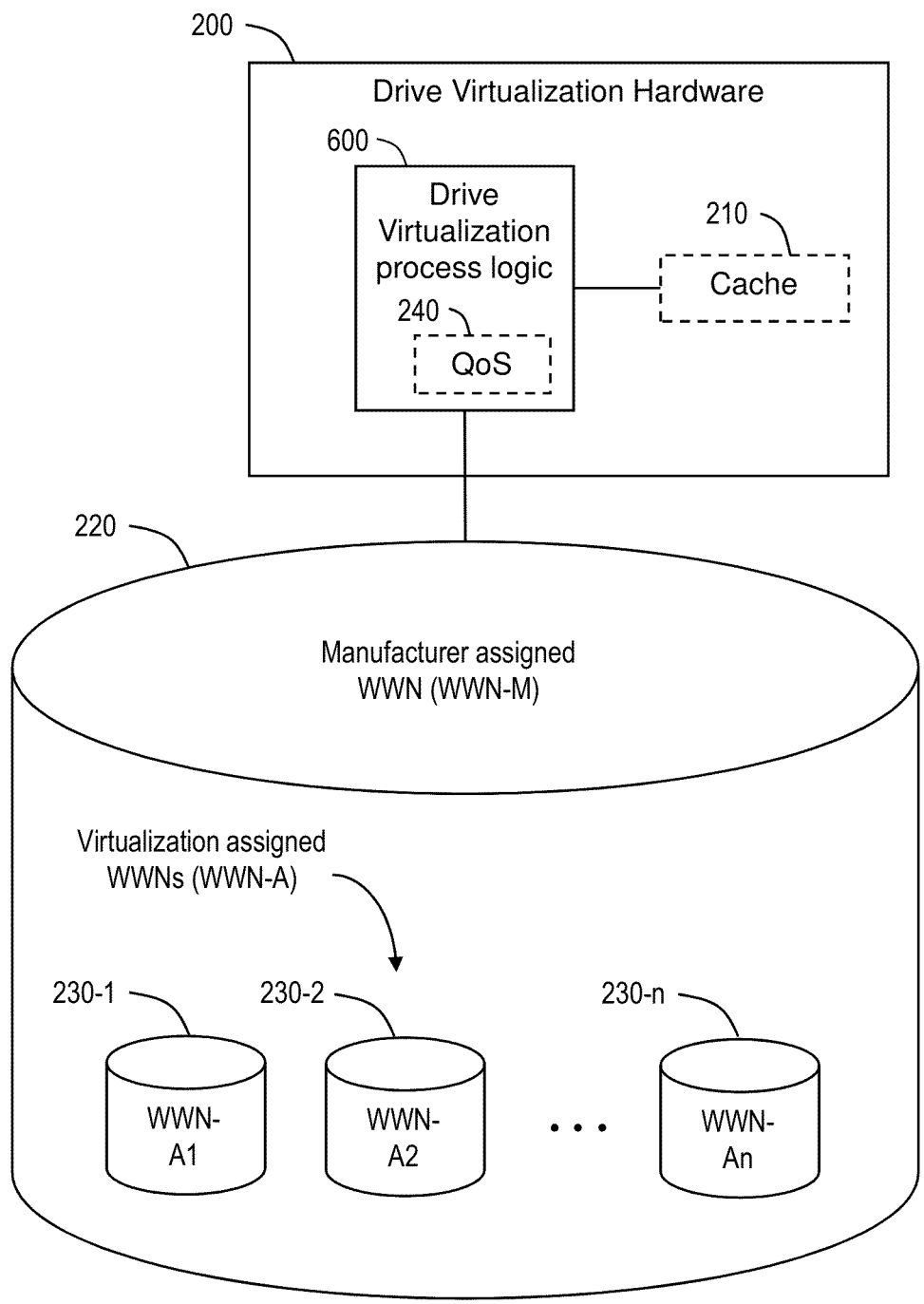
FIG. 2 is an example block diagram of a storage drive with an attached storage virtualization device according to the techniques described herein.

Referring to FIG. 2, an example block diagram of a storage drive 220 with an attached storage drive virtualization device or hardware 200 is shown. The drive virtualization hardware 200 manages data flow into and out of the storage drive 220 such that the drive appears as a plurality of drives 230-1 through 230-n, e.g., virtual drives, to the "outside" world; yet these virtual drives are part of a single hardware device drive, e.g., a hard disc drive (HDD) or solid state drive (SSD). To achieve the requisite virtualization, drive virtualization hardware 200 implements drive virtualization process logic 600. Each virtualization option executes process logic 600 to virtualize a drive that is described herein by examples in connection with FIGS. 2-4, and generally described in connection with FIGS. 5 and 6. In short, drive virtualization process logic 600 may be referred to herein simply as process logic 600.

As shown in FIG. 2, drive 200 has a manufacturer (M) assigned WWN or identifier (ID), denoted as WWN-M. The manufacturer assigned WWN burned into the hardware at the time of drive manufacture. In other examples, the WWN-M may be referred to as an Organizationally Unique Identifier (OUI) or a Universally Unique Identifier (UUID). According to the techniques described herein, process logic 600 partitions drive 220 externally using parameters of drive 220, e.g., logical block addresses (LBAs) known to the drive. Partitioning parameters may be referred to as drive virtualization parameters that include the unique identifiers, as well as a storage capacity and the access properties for each logical storage space. Process logic 600 assigns (denoted as "A" for the WWNs in FIG. 2, e.g., WWN-A) or manages a unique WWN for each virtual drive 230, denoted as WWN-A1 through WWN-An corresponding to virtual drives 230-1 through 230-n.

SAS expanders enable access to a large number of end points (drives) from a given SAS controller host (server) in a hierarchical model. In this context, the down links on a SAS expander can address multiple SAS devices. To improve virtualization, a drive virtualization function, e.g., process logic 600, can be implemented in the down link ports of the expander, e.g., expanders 160, in an expander operational mode. The virtualization function may use a storage device direct interface to the down link, partition the LBA of the storage device into a number of mutually exclusive address ranges, and assign a SCSI function to each one of the partitions; each partition having an associated and assigned WWN-A.

This arrangement allows a small number of physical drives to be seen as a much larger number of drives to the interacting initiators, and each of these drives can be assigned to upstream hosts as direct attached devices (DAS) devices, as viewed from the host. This technique enables a significantly lower cost for deployment of server DAS storage, e.g., within massively scalable data centers (MSDC). The management virtualization function can be implemented, e.g., based on SCSI Management Protocol (SMP) over the host facing SAS interfaces or an out of band interface, such as Inter-Integrated Circuit (I²C) or (System Management Bus (SMbus).

As an added feature to the drive virtualization hardware 200, an optional storage cache 210 and quality of service (QoS) functions 240 may be added to hardware 200. Optional features may be indicated using dashed lines in the various figures. Briefly, the cache 210 may be used to store recently accessed data without accessing the drive 220, while QoS 240 can prioritize access to drive 220. Both the cache 210 and the QoS function 240 can mitigate contention for the hard drive among initiators, e.g., when several initiators have near simultaneously requested access to the drive 220. The cache 210 and the QoS function 240 are described in greater detail hereinafter.

Figure 3:
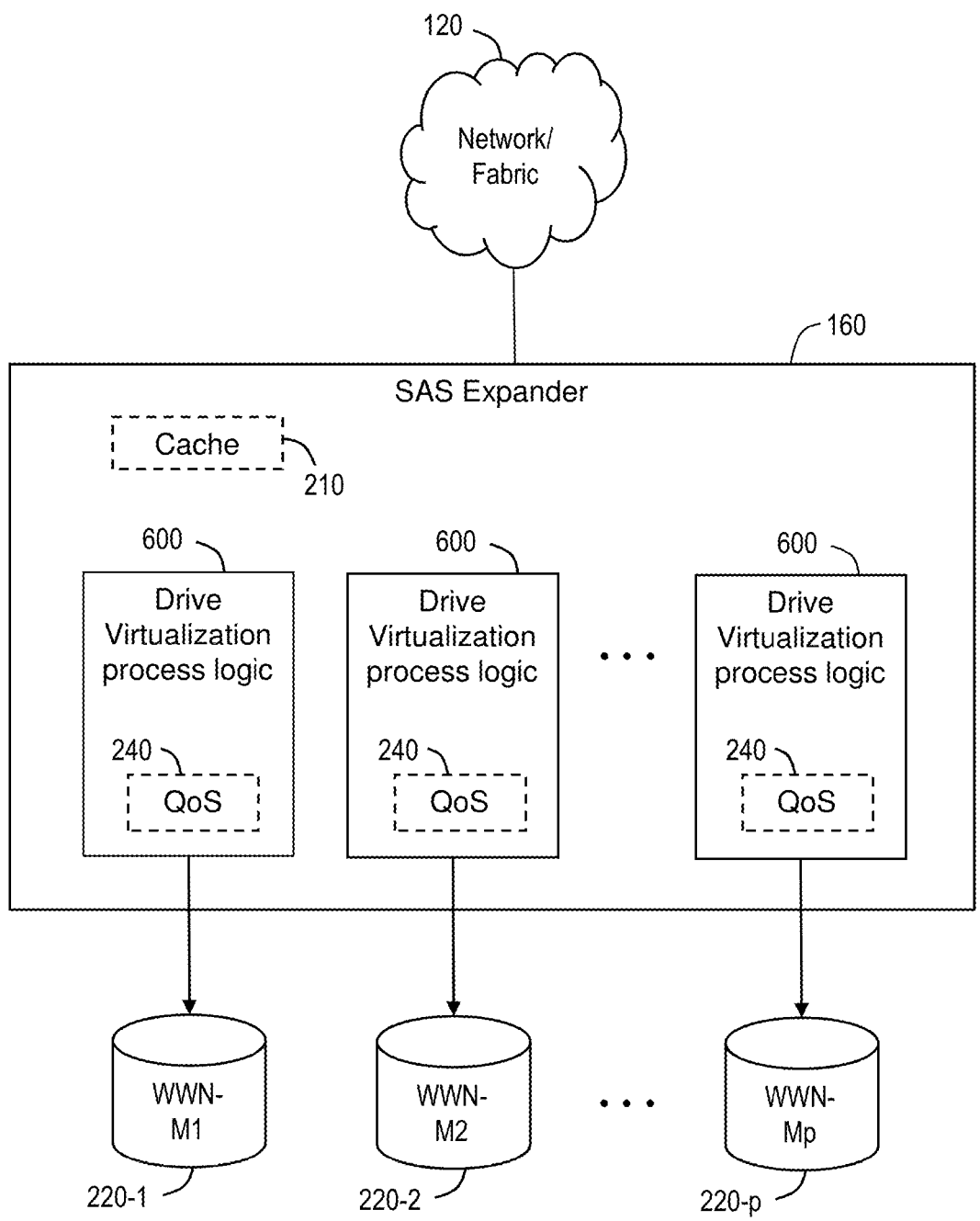
FIG. 3 is an example block diagram of a Serial Attached SCSI (SAS) expander equipped with the storage drive virtualization function.

Turning to FIG. 3, an example block diagram is described for a SAS expander that implements the storage drive virtualization function according to one example embodiment. FIG. 3 depicts SAS expander 160, e.g., SAS expander 160-1 or 160-2 from FIG. 1, that is coupled to both network 120 and a plurality of hardware drives 220-1 through 220-p. Each of the drives 220 has a manufacturer assigned WWN, enumerated as WWN-M1 to WWN-Mp. Each of the drives 220 has associated drive virtualization process logic 600. It can be appreciated that each drive 220 may have its own process 600 or that all of the drives 220 coupled to SAS expander 160 may be managed by way of a single process 600. Optional, cache 210 and QoS 240 are depicted for completeness. Cache 220, may be partitioned on a per drive basis or a SAS expander port or set of ports may each have a cache memory 210, e.g., a separate cache 210 for each drive 220.

SAS expander 160 offers certain advantages as one option for hosting drive virtualization hardware 200. For example, the SAS expander interfaces with a plurality of hard drives and eliminates need for additional external drive virtualization function hardware, thereby reducing cost.

Figure 4:
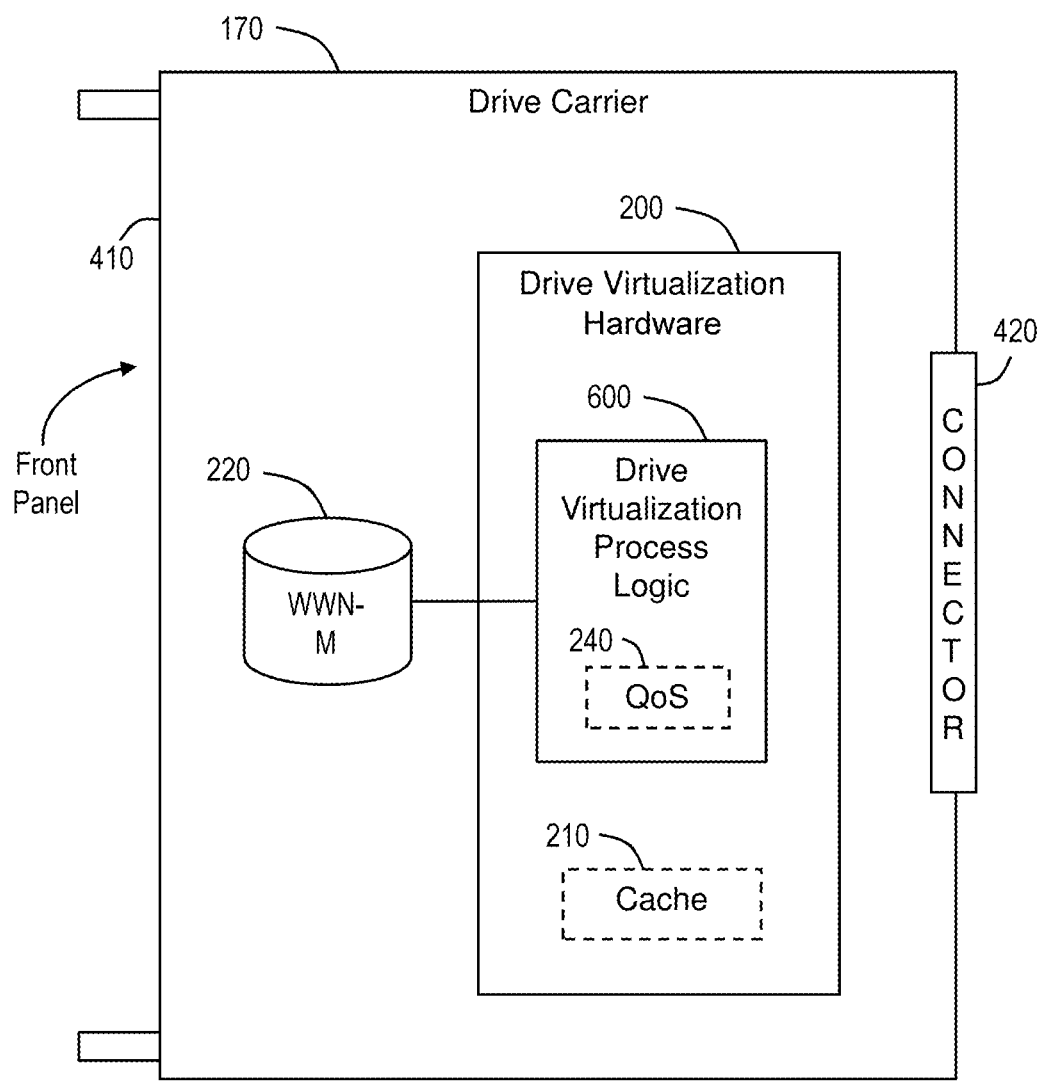
FIG. 4 is an example block diagram of a removable hard drive carrier for a storage drive that is equipped with the storage drive virtualization function.

Referring now to FIG. 4, an example block diagram is described for a pluggable hard drive carrier for a storage drive that is equipped with the storage drive virtualization function according to another example embodiment. FIG. 4 depicts drive carrier 170, e.g., drive carriers 170-1 or 170-2 from FIG. 1, which holds a supported physical storage drive 220 with a manufacturer ID WWN-M. Carrier 170 has a front panel 410; a connector 420; and mechanical hardware, e.g., nuts and bolts (not shown) to physically support drive 220 and support electronics (not shown, but which support drive virtualization hardware 200). Carrier 170 enables drive 220 to be plugged into or removed from a storage array, e.g., one of storage arrays 140, or other multi-drive chassis. Carrier 170 has guides for smooth insertion and front panel 410 has clasps or other such locking mechanisms to "lock" chassis 170 into the drive bay. Connector 420 plugs into the chassis backplane and allows data to be exchanged with other devices in the storage array or external to the storage array, e.g., over network 120.

The support electronics may include circuit boards with bus traces to couple drive 220 to connector 420 as well as the circuitry to support chips that implement optional cache 210 and process logic 600 with optional QoS 240. Additional details regarding storage drive virtualization hardware 200 is described next in connection with FIG. 5 (e.g., as implemented by SAS expander 160, as part of drive carrier 170, or by other hardware options external to the physical drive 220).

Figure 5:
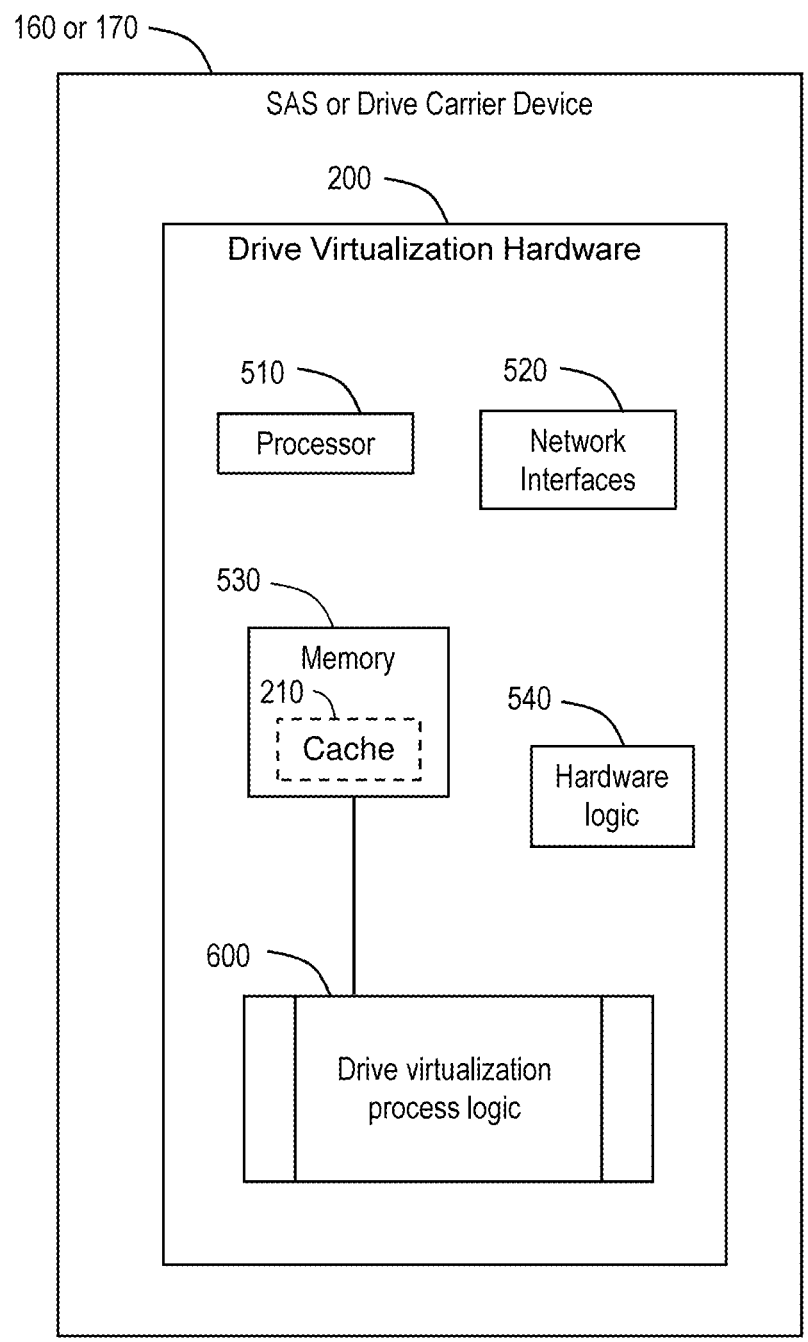
FIG. 5 is an example block diagram of a storage virtualization device equipped with the storage drive virtualization function that may be included in a SAS expander or hard drive carrier.

Referring to FIG. 5, an example block diagram is described for a storage virtualization device equipped with the storage drive virtualization function that may be included, e.g., in a SAS expander or hard drive carrier. The drive virtualization hardware 200 comprises a data processing device 510, a plurality of network interfaces 520, a memory 530, and hardware logic 540. Resident in the memory 530 is software for process logic 600. Process logic 600 may also be implemented in hardware using hardware logic 540, or be implemented in a combination of hardware, software, and firmware.

The data processing device 510 is, for example, a microprocessor, a microcontroller, systems on a chip (SOCs), or other fixed or programmable logic. The data processing device 510 is also referred to herein simply as a processor. The memory 530 may be any form of random access memory (RAM) or other data storage block that stores data used for the techniques described herein. The memory 530 may be separate or part of the processor 510. Instructions for performing the process logic 600 may be stored in the memory 530 for execution by the processor 510 such that when executed by the processor, causes the processor to perform the operations describe herein. The network interfaces 520 enable communication over network 120 shown in FIG. 1, and thus may include FC, Ethernet, optical or other interfaces. It should be understood that any of the devices in system 100 may be configured with a similar hardware or software configuration as drive virtualization hardware 200.

The functions of the processor 510 may be implemented by a processor or computer readable tangible medium encoded with instructions or by logic encoded in one or more tangible media (e.g., embedded logic such as an application specific integrated circuit (ASIC), digital signal processor (DSP) instructions, software that is executed by a processor, etc.), wherein the memory 530 stores data used for the computations or functions described herein (and/or to store software or processor instructions that are executed to carry out the computations or functions described herein). Thus, functions of the process logic 600 may be implemented with fixed logic or programmable logic (e.g., software or computer instructions executed by a processor or field programmable gate array (FPGA)).

Figure 6:
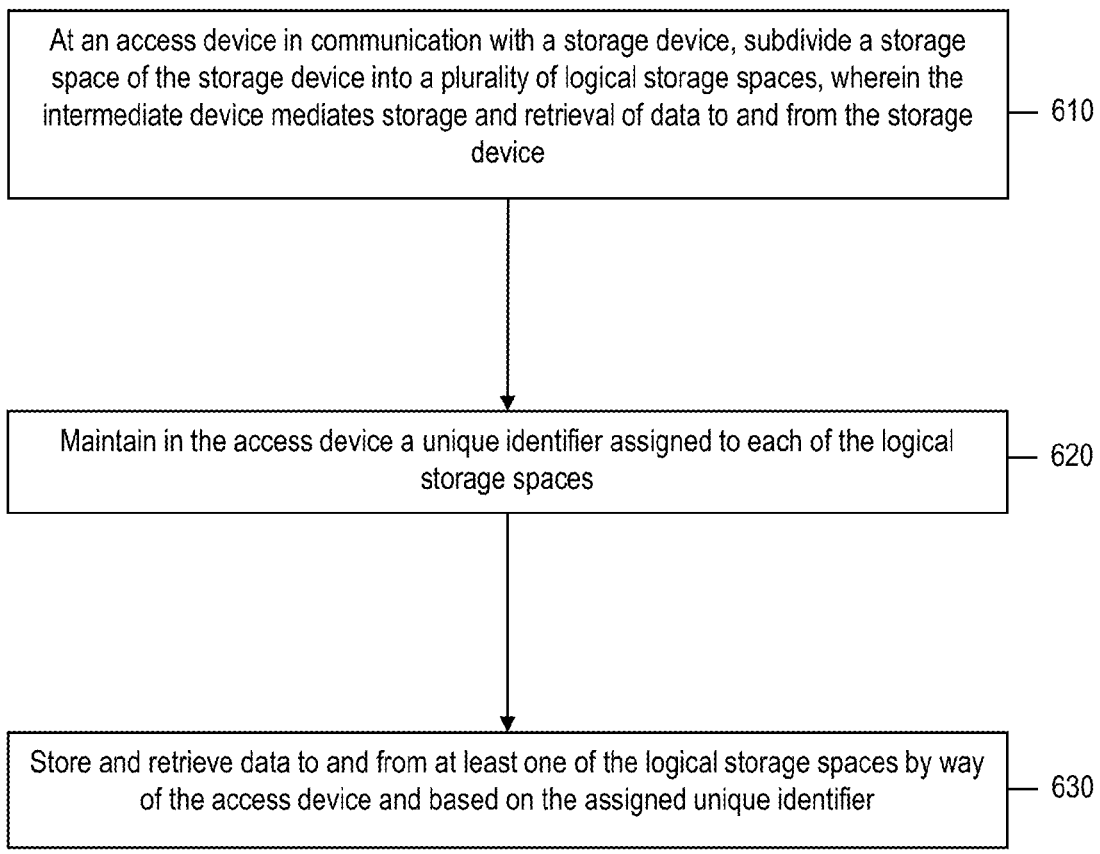
FIG. 6 is an example flowchart generally depicting a process for storage drive virtualization.

FIG. 6 is a flowchart that generally depicts an example process for implementing drive virtualization process logic 600. At 610, an access device, e.g., SAS expander 160 or drive carrier 170, that is in communication with a storage device, e.g., drive 220, subdivides the storage space of the storage device into a plurality of logical storage spaces. The access device mediates or manages storage and retrieval of data to and from the storage device. At 620, the access device maintains a unique identifier (such as a WWN) assigned to each of the logical storage spaces.

At 630, storage and retrieval of data to and from at least one of the logical storage spaces by way of the access device is based on the assigned unique identifier. In this regard, the access device is associated with the physical communication pathway or is otherwise inline between a client device, e.g., a server, and the storage device. The storage space may be subdivided using LBAs of the storage device. For example, a storage device has 100 megabytes (MBs) of space that is to be subdivided or virtually partitioned into subsets of logical storage spaces, a first virtual partition may use the LBAs associated with MBs 0-10, a second virtual partition may use the LBAs associated with MBs 10-22, and so on, until the desired space allocations are met. Concurrently or at some other time each virtual partition is assigned a WWN, e.g., WWN-A1 through WWN-An as shown in FIG. 2. The storage device need not be fully allocated and any remain storage space may be reserved for future virtual partitioning.

The access device or another network device, e.g., a management platform, may generate drive virtualization parameters that include the unique identifiers, as well as a storage capacity and the access properties for each logical storage space. The unique IDs, e.g., WWNs, may be similar to MAC addresses, as mentioned above. The unique IDs may be assigned based on the management system policies and since the IDs are not "burned in" by the manufacturer, they may be defined based on IEEE OUI assigned to the organization/company responsible for the management system. The drive virtualization parameters may be stored in non-volatile memory (NVM) on the access device, at another device, or in multiple locations should the virtualization parameter storage fail. The virtualization parameters may also be stored as a meta-data written on the physical drive. When not generated locally at the access device, the virtualization parameters may be received from another device.

In other examples, caching and QoS functionality may be employed. A virtualized drive that is subdivided according the techniques described herein can create significant I/O storage and retrieval load on the associated physical drive. Accordingly, the caching of recently accessed data in high performance NVM, such as battery or flash backed non-volatile ram, or flash memory added to the drive virtualization function. This technique can effectively reduce the load on the physical drive and offer reduced average access latency. The caching algorithms may also take advantage of what is known from the virtualization function that is currently deployed, e.g., by allocating available cache memory based on the QoS function. Thus, caching may be used on a per logical storage space basis.

When applying QoS parameters, e.g., by way of the access device, to one or more of the logical storage spaces, storage and retrieval can be mediated according to the QoS parameters. A given physical drive is logically presented as multiple virtual drives, e.g., SAS drives, with each drive having an assigned unique WWN. This allows one or more of the virtual drives to interact with a different host, thereby creating competing demands for access to the physical drive in the form of the number of I/O operations to be performed of the drive.

A physical drive has an upper limit on the total number of I/O operations that it can support in a time window, typically expressed as I/O operations per second, or IOPs. The physical drive is unaware that the IOPs demands are coming from different hosts, and therefore, cannot distinguish between them. The I/O initiator is only known to drive virtualization function 200, e.g., as shown in FIGS. 1 and 4. QoS functionality can be added to drive virtualization function 200. For example, QoS parameters may include a maximum number of IOPs and/or the maximum streaming bandwidth allowed per a given virtual drive. These parameters may be assigned either at the time when the virtual drive is created and the corresponding WWN is assigned, or at a subsequent time. The QoS parameters help ensure that each of the attached hosts (servers) obtains a desired level of performance from its assigned virtual drive(s).

Additional QoS optimizations may include 1) a QOS parameter that is shared among or between a given set of virtual drives and/or 2) that no QOS parameters defined, in which case best effort IOPs and streaming bandwidth are offered, e.g., as in a non-QoS throttled Ethernet connection.

Techniques provided herein have the advantage of adding storage device virtualization functionality at the down links of SAS expanders, or between the SAS expanders and drives. These techniques enable a small number of physical drives to be seen as a much larger number drives, and each of these drives can be assigned to upstream hosts as DAS devices, thereby significantly lowering drive costs for deployment of server DAS storage, e.g., in massively scalable data centers.

The above description is intended by way of example only.

What is claimed is:

1. A method comprising:
at a Serial Attached Small Computer System Interface (SAS) device in communication with a physical storage device, subdividing a storage space of the physical storage device into a plurality of logical storage spaces, wherein the physical storage device supports a maximum number of Input/output Operations Per Second (IOPS);
assigning quality of service (QoS) parameters to one or more of the logical storage spaces, the QoS parameters including a maximum number of IOPS available to the one or more logical storage spaces, wherein the maximum number of IOPS available to the one or more logical storage spaces is based on the maximum number of IOPS supported by the physical storage device;
assigning a World Wide Name (WWN) to each of the logical storage spaces; and
storing and retrieving data to and from at least one of the logical storage spaces by way of the SAS device based on the assigned WWN and the QoS parameters.

2. The method of claim 1, wherein subdividing comprises subdividing the storage space using logical block addresses (LBAs) of the physical storage device.

3. The method of claim 1, further comprising generating one of the WWNs, setting a storage capacity for each logical storage space, and establishing access properties for each logical storage space at one of the SAS device and a network device.

4. The method of claim 1, further comprising receiving one or more of the WWNs, a storage capacity for each logical storage space, and access properties for each logical storage space from a network management device.

5. The method of claim 1, further comprising caching, at the SAS device, data retrieved from one or more of the logical storage spaces by allocating a cache of memory to each of the one or more logical storage spaces based on the QoS parameters assigned to the one or more logical storage spaces.

6. An apparatus comprising:
a Serial Attached Small Computer System Interface (SAS) network interface unit configured to enable network communications over one or more SAS networks;
a memory;
a processor coupled to the SAS network interface unit and to the memory, wherein the processor is configured to:
subdivide a storage space of a physical storage device into a plurality of logical storage spaces, wherein the physical storage device supports a maximum number of Input/output Operations Per Second (IOPS);
assign quality of service (QoS) parameters to one or more of the logical storage spaces, the QoS parameters including a maximum number of IOPS available to the one or more logical storage spaces, wherein the maximum number of IOPS available to the one or more logical storage spaces is based on the maximum number of IOPS supported by the physical storage device;
mediate storage and retrieval of data to and from the storage device;
assign a World Wide Name (WWN) to each of the logical storage spaces; and
store and retrieve data to and from at least one of the logical storage spaces based on the assigned WWN and the QoS parameters.

7. The apparatus of claim 6, wherein the processor is configured to subdivide the storage space using logical block addresses (LBAs) of the physical storage device.

8. The apparatus of claim 6, wherein the processor is further configured to generate one of the WWNs, set a storage capacity for each logical storage space, and establish access properties for each logical storage space.

9. The apparatus of claim 6, wherein the processor is further configured to receive one or more of the WWNs, a storage capacity for each logical storage space, and access properties for each logical storage space.

10. The apparatus of claim 6, wherein the processor is further configured to cache data retrieved from one or more of the logical storage spaces by allocating a cache of memory to each of the one or more logical storage spaces based on the QoS parameters assigned to the one or more logical storage spaces.

11. A non-transitory computer readable medium storing instructions that, when executed by a processor, cause the processor to:
subdivide a storage space of a physical storage device into a plurality of logical storage spaces, wherein the physical storage device supports a maximum number of Input/output Operations Per Second (IOPS);
assign quality of service (QoS) parameters to one or more of the logical storage spaces, the QoS parameters including a maximum number of IOPS available to the one or more logical storage spaces, wherein the maximum number of IOPS available to the one or more logical storage spaces is based on the maximum number of IOPS supported by the physical storage device;
mediate storage and retrieval of data to and from the storage device;
assign a World Wide Name (WWN) to each of the logical storage spaces; and
store and retrieving data to and from at least one of the logical storage spaces by way of a Serial Attached Small Computer System Interface (SAS) device based on the assigned WWN and the QoS parameters.

12. The computer readable storage media of claim 11, further comprising instructions operable to subdivide the storage space using logical block addresses (LBAs) of the physical storage device.

13. The computer readable storage media of claim 11, further comprising instructions operable to generate one of the WWNs, set a storage capacity for each logical storage space, and establish access properties for each logical storage space.

14. The computer readable storage media of claim 11, further comprising instructions operable to receive one or more of the WWNs, a storage capacity for each logical storage space, and access properties for each logical storage space.

15. The computer readable storage media of claim 11, further comprising instructions operable to cache data retrieved from one or more of the logical storage spaces by allocating a cache of memory to each of the one or more logical storage spaces based on the QoS parameters assigned to the one or more logical storage spaces.

16. The method of claim 1, wherein the SAS device comprises an SAS expander.

17. The apparatus of claim 6, further comprising an SAS expander.

18. The method of claim 1, wherein at least one of the QoS parameters is shared across a set of logical storage spaces among the plurality of logical storage spaces.

19. The apparatus of claim 6, wherein at least one of the QoS parameters is shared across a set of logical storage spaces among the plurality of logical storage spaces.

20. The computer readable storage media of claim 11, wherein at least one of the QoS parameters is shared across a set of logical storage spaces among the plurality of logical storage spaces.

* * * * *